(12) United States Patent
Andriessen et al.

(10) Patent No.: US 8,877,321 B2
(45) Date of Patent: Nov. 4, 2014

(54) SIZING-ADHESIVE COMPOSITION

(75) Inventors: Freddy Johannes Martina Andriessen, Hulst (NL); Leonard Jannusch, White Bear Lake, MN (US); Peter Obradovic-Sandmann, Xanten (DE)

(73) Assignee: Cargill, Incorporated, Wayzata, MN (US)

( * ) Notice: Subject to any disclaimer, the term of this patent is extended or adjusted under 35 U.S.C. 154(b) by 683 days.

(21) Appl. No.: 12/839,001

(22) Filed: Jul. 19, 2010

(65) Prior Publication Data
US 2011/0064918 A1 Mar. 17, 2011

Related U.S. Application Data

(60) Provisional application No. 61/232,611, filed on Aug. 10, 2009.

(30) Foreign Application Priority Data

Aug. 10, 2009 (EP) .................................... 09010285

(51) Int. Cl.
| | |
|---|---|
| B32B 3/28 | (2006.01) |
| B31F 1/20 | (2006.01) |
| A61K 47/48 | (2006.01) |
| C08B 37/00 | (2006.01) |
| C08L 3/04 | (2006.01) |
| C09D 103/06 | (2006.01) |
| C09D 105/00 | (2006.01) |
| C09J 105/00 | (2006.01) |
| B31F 1/28 | (2006.01) |
| C09J 103/02 | (2006.01) |
| C09J 129/04 | (2006.01) |

(52) U.S. Cl.
CPC .............. *C09J 103/02* (2013.01); *C09J 105/00* (2013.01); *B31F 1/2809* (2013.01); *C09J 129/04* (2013.01)
USPC ........... 428/182; 156/205; 156/208; 156/328; 156/336; 106/205.01; 524/48; 525/54.2; 525/56; 523/118

(58) Field of Classification Search
USPC .......... 428/182, 526, 530; 156/205, 208, 290, 156/292, 326, 331.3, 328, 336; 106/617, 106/901, 205.01; 524/48, 52, 53, 557, 803; 525/56, 54.2; 523/118
See application file for complete search history.

(56) References Cited

U.S. PATENT DOCUMENTS

| | | | | | |
|---|---|---|---|---|---|
| 3,617,429 | A | * | 11/1971 | Le Blanc ....................... | 428/182 |
| 4,440,898 | A | * | 4/1984 | Pomplun et al. .............. | 524/503 |
| 4,933,383 | A | * | 6/1990 | Murdock et al. ................ | 524/52 |
| 5,093,393 | A | * | 3/1992 | Faber et al. ..................... | 524/30 |
| 5,362,801 | A | * | 11/1994 | Amici et al. .................... | 525/57 |
| 5,776,242 | A | | 7/1998 | Gill et al. | |
| 5,932,639 | A | * | 8/1999 | Eden et al. ..................... | 524/48 |

FOREIGN PATENT DOCUMENTS

| | | |
|---|---|---|
| EP | 0 239 421 | 9/1987 |
| EP | 0 383 214 | 8/1990 |
| EP | 0 470 748 | 2/1992 |

OTHER PUBLICATIONS

European Search Report from corresponding EP 09 01 0285, mailed Feb. 12, 2010, 6 pages.

\* cited by examiner

*Primary Examiner* — Donald J Loney

(57) ABSTRACT

A novel sizing-adhesive composition for corrugating characterised in that it comprises at least one low molecular weight, water soluble polymer such as a maltodextrin, corrugating boards prepared therewith and methods of producing them.

14 Claims, No Drawings

SIZING-ADHESIVE COMPOSITION

CROSS REFERENCE TO RELATED APPLICATION

This application claims the benefit of European patent application Serial No. 09010285.6 filed, 10 Aug. 2009 entitled SIZING-ADHESIVE COMPOSITION and U.S. provisional application Ser. No. 61/232,611, filed 10 Aug. 2009 entitled SIZING-ADHESIVE COMPOSITION, which are hereby incorporated by reference in their entirety.

FIELD OF THE INVENTION

The present invention relates to adhesive compositions. In particular, it relates to novel corrugating adhesives, to methods of producing corrugated board with such adhesives and to the corrugated board obtainable with such methods.

BACKGROUND OF THE INVENTION

The manufacture of corrugated board typically involves the following steps:
(a) fluting a first cellulosic sheet by passing it between heated corrugating rolls so that the obtained "corrugating medium" has a substantially sinusoidal or serpentine cross-section;
(b) applying adhesive to the protruding flute tips on at least one side of the corrugating medium; and
(c) bonding a non-corrugated or planar cellulosic sheet ("liner sheet") to the adhesive-coated flute tips.

The resulting product, having corrugating medium on one side and a liner sheet on the other, is called single-faced corrugated board. It can be used, for example, as a liner or buffer material within a container. More commonly, however, adhesive is applied to the flute tips on both sides of the corrugating medium and a second liner sheet is applied, effectively sandwiching the corrugating medium between the two liner sheets. The resulting product is known as double-faced corrugated board and is commonly used for the manufacture of cardboard boxes and other such containers or packaging materials. For increased rigidity or strength, several such single-faced and/or double faced boards can be combined to produce multiple-wall corrugated board.

To ensure proper adhesion, the step of bonding the corrugating medium to its one or more liner sheets is normally carried out under pressure and at temperatures of about 150 to 200° C. These high temperatures encourage curing of the adhesive and evaporation of any excess water.

Adhesives used in the production of corrugated board are selected on the basis of several factors including, for example, cost and the intended use of the finished corrugated product. Starch-based adhesives, such as Stein Hall adhesives, are the most commonly used because of their desirable bonding properties, ease of preparation and low cost.

Nonetheless, there is a continued drive in the industry to reduce the cost of producing corrugated board. A number of areas have been targeted in this respect including, for example, energy efficiency. One of the main costs incurred in the production of corrugated board is, indeed, the energy required for heating. Heating is used both to gelatinise the starch-based adhesives (thereby increasing viscosity and bonding between sheets) and for drying (i.e. to remove any excess water remaining on the board from the liquid adhesives). In order to reduce heating requirements, one approach has been to reduce the water content of the corrugating adhesives. Put another way, this means increasing their dry solid content. This concept can, however, only be taken so far as adhesive viscosity (directly linked to dry solid content) must be strictly controlled. A too viscous adhesive would be difficult to apply to the flute tips and could cause clogging and flow problems on the corrugating machine. What's more, high viscosity can cause excess transfer of adhesive to the paper (add-on) thereby dramatically increasing adhesive costs.

Another approach has been to reduce the overall adhesive add-on. Again, this naturally reduces the quantity of water that will need to be evaporated off the formed board. It will also cut raw material costs (e.g. the quantity of adhesive needed per square meter of board produced). Unfortunately, add-on cannot be reduced below a certain level without having a detrimental effect on bond strength and, therefore, on board quality.

Moving away from the adhesives themselves, another area that has been targeted in an attempt to cut costs has been the quality (thickness, weight) of the cellulosic sheets used to form the corrugated board. As paper pulp becomes more expensive due to increased demand, there is a need to decrease the use of paper to make corrugated containers. A common process is to add materials such as starch to strengthen papers used in corrugated containers. This strengthening is known as "sizing". Sizing is important to increase the ability of corrugated containers to resist collapsing when they are stacked on each other while filled with goods. This important property is known in the industry as "stacking strength". Corrugated board manufacturers use several methods to measure box stacking strength, including the Edge Crush Test (ECT—TAPPI test no. T 838 om-07—used to measure the strength of the corrugated board itself) and the Box Compression Test (BCT—TAPPI test no. T 804 om-06—used to measure the crushing strength of a standard box made with corrugated board). In order to improve ECT and/or BCT performance it is generally accepted that higher strength papers are needed. Two well-known tests to indicate paper strength are the Short Span Compression Test (SCT—TAPPI test no. T826 (wd-01)) and the Ring Crush Test (RCT—TAPPI test no. T818 (cm97)).

In order to meet multiple customer needs, the corrugated board manufacturer needs to buy papers with certain strengths and must inventory multiple papers. If the strength of the paper could be adjusted by the corrugator, this would provide a more flexible process wherein the strength of the corrugated box could be adjusted using fewer papers. Obviously, though, any reduction in sheet quality will also have a negative impact of board strength and functionality. As such, the possibilities of savings in this area are limited.

There is therefore still a clear need to develop new and improved corrugating adhesives and better, more economic processes for producing corrugated board which do not have a detrimental effect on the quality of the final product. The present invention addresses these needs.

STATEMENTS OF THE INVENTION

According to a first aspect of the present invention, there is provided a sizing-adhesive for corrugating characterised in that it comprises at least one low molecular weight, water soluble polymer.

According to another aspect of the present invention, there is provided a corrugated board which comprises at least one sheet of corrugating medium bonded to at least one liner sheet, characterised in that:
one or more of the sheets of corrugating medium and/or one or more of the liner sheets are coated with a sizing-adhesive comprising at least one low molecular weight, cold water soluble polymer; and/or at least one sheet of corrugating medium is bonded to at least one liner sheet with said sizing-adhesive.

According to a further aspect of the present invention, there is provided a process for producing corrugated board, characterised in that it comprises the following steps:

providing at least one sheet of corrugating medium and at least one liner sheet;

coating the liner sheet and/or corrugating medium on at least one surfaces with a sizing-adhesive comprising at least one low molecular weight, cold water soluble polymer;

contacting the corrugating medium and liner sheet to cause adhesion; and drying.

DETAILED DESCRIPTION

The present invention provides a sizing-adhesive for corrugating which comprises at least one low molecular weight, water soluble polymer.

The term "sizing-adhesive for corrugating" as used herein refers to an adhesive composition capable both of forming a bond between two sheets of paper (or cellulosic sheets) and of increasing the strength of the paper(s) to which it is applied. Specifically, it refers to those adhesives adapted for use in the production of corrugated board, as defined below.

To avoid confusion, it should be noted that the term "sizing-adhesive" as used herein may refer both to the liquid adhesives in their finished, ready-to-use form and to the dry or liquid pre-mixes used to prepare the finished adhesives. Sizing-adhesive dry mixes are compositions which contain at least one low molecular weight, water soluble polymer but a limited amount of the sizing-adhesive's final water content (as defined below). Similarly, a liquid sizing-adhesive pre-mix will contain at least one low molecular weight, water soluble polymer and all or a part of the sizing-adhesive's final water content. If it is intended to refer only to one particular form of the sizing-adhesive, this will be specified or will be apparent from the context.

The sizing-adhesive (or simply "adhesive" for short) of the present invention comprises at least one low molecular weight, water soluble polymer. A polymer is typically defined as a large molecule consisting of repeating structural units. A polymer as used in accordance with the present invention may be either a biopolymer (i.e. a polymer which can be isolated from nature, such as a polysaccharide) or a synthetic polymer (i.e. a man-made polymer, such as polyvinyl alcohol).

The term "low molecular weight" as used herein should be understood relative to the average molecular weight of polymers. Thus, the polymer of the present invention will preferably have a mean molecular weight (Mw) below 200,000 Daltons, preferably below 150,000 Daltons, more preferably below 125,000 Daltons, more preferably below 100,000 Daltons and most preferably below 75,000 Daltons or even 50,000 Daltons. According to certain embodiments, the polymer may have a mean molecular weight below 30,000 Daltons, 20,000 Daltons or 10,000 Daltons.

The term "water soluble" refers to polymers which are readily soluble in water. The term "soluble" itself may refer to a number of different characteristics depending on the nature of the polymer under consideration. It may refer to polymers whose molecular structure is completely disrupted in water resulting in an equilibrium mixture of e.g. polymer units and the water molecules that surround them. Other polymers will remain intact but will interact with the surrounding water molecules resulting in a disruption of their secondary or tertiary structures only. Finally, the term "soluble" will be used to refer to polymers, typically polymers having a granular structure (like starch), which incorporate water molecules and therefore effectively swell in water, forming a viscous, colloidal dispersion. Furthermore, these water soluble polymers may be only soluble in the presence of hot water and therefore may be suspended in granular form in the liquid sizing-adhesive at temperatures below which they are soluble. They may later be made soluble by applying heat to the sizing-adhesive during the corrugating process.

A skilled person will readily be able to identify polymers suitable for use in accordance with the present invention based on the above definitions. Examples of such polymers include, without limitation, polysaccharides and polysaccharide derivatives, sodium lignosulfonate, sodium silicate, polyvinyl alcohol and polyoxyethylene.

Preferably, the polymer of the invention will be selected from a polysaccharide or a polysaccharide derivative including, amongst others, native or modified starches, powdered glucose, dried corn syrup solids and soybean flour. More preferably, the polymer will be selected from native or modified starches. Native starches can be from any available source including for instance potato, maize, wheat, rice, tapioca, pea, sorghum and sago. They may be waxy or non-waxy starches. Modified starches are native starches which have been modified e.g. by enzymatic, chemical and/or heat treatment and include, by way of example only, oxidised starches, acid-thinned starches, esterified starches, etherified starches, dextrins, maltodextrins, cross-linked starches and so on. According to one possible embodiment, the polymer of the invention will be a maltodextrin with a dextrose equivalence (DE) of 4 to 20.

The sizing-adhesive of the invention may contain just one type of polymer as defined above or it may contain a mixture of two or more such polymers. Overall, it will preferably contain 30 to 95%, preferably between 40 and 90%, more preferably between 50 and 90%, more preferably between 60 and 90% by weight of said polymer or polymers on a dry weight basis.

It may also contain a native starch having a mean molecular weight (Mw) of above 200,000 Daltons. These native starches may be from any source but will preferably be native wheat or corn starches. They will preferably be included in the sizing-adhesives of the present invention in an amount of 1 to 70% by weight on a dry weight basis, more preferably in an amount of 2 to 50%, even more preferably in an amount of 5 to 30% by weight.

The sizing adhesive of the invention will also typically comprise borax or a borax derivative (such as borax decahydrate), preferably in an amount of 0.1 to 5% by weight on a dry weight basis, more preferably in an amount of 0.1 to 2% by weight. Thus, in one particularly preferred embodiment, the sizing-adhesive of the invention will comprise a low molecular weight, water soluble polymer, a native starch and borax or a borax derivative.

It may also contain one or more additives, selected from the group consisting of fillers such as calcium carbonate, kaolin clay or titanium dioxide; bonding additives such as polyvinyl acetate, polyvinyl acetate-ethylene or acrylic polymers; humectants such as glycerol, glycerine or urea; tackifiers such as sodium borate or sodium metaborate; water-resistance resins such as urea-formaldehyde resins, phenol-formaldehyde resins or ketone-formaldehyde resins; rheology modifiers such as carboxymethyl cellulose, xanthan gum or guar gum; antifoam agents; preservatives; anti-microbials and mixtures of any two or more thereof. Fillers may preferably be included in an amount of between 1 and 30%, more preferably between 5 and 30%, most preferably between 10 and 20% by weight on a dry weight basis. Bonding additives may be included in an amount of between 1 and 30%, more preferably between 5 and 30% by weight on a dry weight basis. Humectants may be included in an amount of between 0.1 and 10%, more preferably between 0.5 and 5% by weight on a dry weight basis. Tackifiers may be included in an amount between 0.1 and 10%, more preferably between 0.5 and 10% by weight on a dry weight basis. Water resistance resins may be included in an amount of 0.1 to 10%, preferably in an amount of 1 to 5% by weight on a dry weight basis. Rheology modifiers may be included in an amount of 0.1 to 5% by weight on a dry weight basis. Antifoam agents, preservatives and antimicrobials will preferably be incorporated at an effective level, typically between 0.1 and 1% by weight on a dry weight basis.

Further known additives may also be included as desired or appropriate. Their nature and concentration will readily be determined by a skilled person based on standard practice in the art.

The finished sizing-adhesive, i.e. the sizing-adhesive in its ready-to-use state, will preferably have a total dry substance, by weight, of between 20 and 80%, more preferably of between 30 and 60%. It will advantageously have a Brookfield viscosity of between 100 and 3000 mPas, preferably of between 500 and 2000 mPas, even more preferably of between 600 and 1000 mPas when measured at 25° C., 100 rpm and with a no. 4 spindle. Furthermore, the ready-to-use adhesive will preferably be alkaline. According to one particular embodiment, it will have a pH of above 7, preferably above 8, and ideally of between 9 and 11. If necessary, the pH of the sizing-adhesive can be adjusted by adding an appropriate amount of a base such as sodium hydroxide.

The sizing-adhesive of the present invention can be used like standard corrugating adhesives, i.e. by applying it to the flute tips of the corrugating medium, but will preferably be applied directly to the one or more liner sheets, like a coating or surface sizing composition. Alternatively, it could be applied both to the flute tips of the corrugating medium and as a substantially continuous film to the liner paper. In a yet further embodiment, it may be applied as a substantially continuous film to the corrugating medium, with or without coating of the liner paper. Thus, the present invention also relates to a novel process for producing corrugated board, characterised in that it comprises the following steps:
- providing at least one sheet of corrugating medium and at least one liner sheet;
- coating at least one of the liner sheets and/or sheets of corrugating medium on at least one surface with a sizing-adhesive containing at least one low molecular weight, cold water soluble polymer;
- optionally applying the sizing-adhesive to the flute tips on at least one side of at least one of the sheets of corrugating medium;
- bringing the adhesive surfaces (i.e. the one or more surfaces to which adhesive has been applied, whether continuously or not) of the corrugating medium and/or liner sheets together to cause adhesion; and
- drying the resulting corrugated board.

The term "corrugated board" as used herein may refer to any sheet-type material comprising at least one sheet of corrugating medium adhered to at least one sheet of non-corrugated medium (or "liner sheet"). The term therefore includes both single-faced boards, double-faced boards and all types of multiple-wall boards as described above.

The corrugated boards produced according to the process of the invention may have any flute height. A flute height of 4.0-4.8 mm, for example, is referred to as an A-flute; a flute height of 2.1-3 mm is referred to as a B-flute; a flute height of 3.2-3.9 mm is referred to as a C-flute; a flute height of 1.0-1.8 mm is referred to as an E-flute; a flute height of approximately 0.75 mm is referred to as an F-flute; and a flute height of 0.5-0.55 mm is referred to as an N-flute. E-, F- and N-flutes are also referred to as micro- or nano-flutes. Of course, if the board is a multiple-wall board, each "wall" may have flutes of a different height. A typical combination is, for instance, a double-wall board comprising both B- and E-flutes.

The term "coating" or "coated" as used herein is intended to distinguish the adhesive-application method used in accordance with the present invention from the standard flute-tip application method typically used in the corrugating industry. It refers to the fact that the one or more liner sheets and/or one or more sheets of corrugating medium will be covered over substantially their entire surface, on at least one side, with the sizing-adhesive of the invention. Of course, for corrugated board containing more than one liner sheet and/or more than one sheet of corrugating medium, it will be preferred but not necessary for each of the sheets to be coated. Thus, for example, a double-faced board may comprise one liner sheet coated with the sizing-adhesive of the invention and one uncoated liner sheet. Preferably, however, both liner sheets will be coated on at least one side.

Application of the sizing-adhesive to the one or more liner and/or corrugating medium sheets can be achieved using any available method. Examples of known coating technologies include, without limitation, air knife coating, rod coating, bar coating, wire bar coating, spray coating, brush coating, cast coating, flexible blade coating, gravure coating, jet applicator coating, short dwell coating, slide hopper coating, curtain coating, flexographic coating, size-press coating, reverse roll coating and transfer roll coating (metered size press or gate roll coating). Preferably, coating of the sizing-adhesive will be carried out on the corrugator.

To ease application of the sizing-adhesive, it may, according to one preferred embodiment, be heated to between 30 and 80° C., preferably to between 40 and 60° C. before being coated onto the at least one liner sheet. Preferably, the sizing-adhesive will be applied to the at least one liner and/or corrugating medium sheets in an amount of up to 20 g per square meter on a dry weight basis, more preferably in an amount of 1 to 15 $g/m^2$, even more preferably in an amount of 3 to 10 $g/m^2$.

After application, the coated (or "adhesive") surface of the at least one liner sheet is brought into contact with a sheet of corrugating medium (which itself may be coated with sizing-adhesive or have adhesive applied to its flute tips) to cause adhesion. This step is preferably carried out under pressure. Advantageously, it has been found that bonding between the corrugating medium and the liner sheet does not require heat to the same extent as with classical corrugating adhesives of the art. Thus, according to one particular embodiment, the bonding step may be carried out at a temperature below 200° C., preferably below 100° C. Drying of the board can similarly be carried out at relatively low temperatures (i.e. below 200° C., preferably below 100° C.).

Advantageously, it has been found that by using the above process, corrugated boards which are stronger and/or cheaper to produce can be obtained. As such, corrugated boards obtained or obtainable according to the above process, and/or corrugated boards having at least one of their one or more liner and/or corrugating medium sheets coated with the above sizing-adhesive are also part of the present invention.

In particular, it has been found that such sheets have a short span compression strength at least 1% higher, preferably at least 2% higher, per gram of starch add-on, compared to a corresponding uncoated sheet.

It has also been found that the liner sheets have a ring crush strength at least 1% higher, preferably at least 2% higher, per gram of starch add-on, compared to a corresponding uncoated sheet.

What's more, the corrugated boards of the present invention can advantageously be produced with sheet materials of lesser weight (quality) without affecting the quality of the board itself. Accordingly, a method of reducing the required weight of sheets used in the manufacture of corrugated board comprising coating said sheets with a sizing-adhesive as defined herein will also be part of the present invention. Advantageously, the required sheet weight can be reduced by up to 15 $g/m^2$, preferably by between 3 and 15 $g/m^2$, more preferably by between 3 and 8 $g/m^2$, even more preferably between 3 and 5 $g/m^2$, for example by between 4 and 5 $g/m^2$, per gram of sizing-adhesive add-on. As a result, cellulosic sheets weighing no more than 400 $g/m^2$, preferably between 75 and 200 $g/m^2$ can be used for one or more of the at least one liner sheets and/or corrugating medium sheets of the corrugated board. Preferably, for double-faced or multiple-wall boards, all of the liner sheets and/or all of the corrugating medium sheets will be selected from cellulosic materials weighing between 75 and 400 $g/m^2$.

Certain embodiments of the present invention will now be described by way of the following, non-limiting examples.

EXAMPLES

Example 1

Sample adhesives were prepared by mixing the dry ingredients with water as listed in Table 1. Each sample was mixed for 30 min at 1000 rpm with an agitator. Samples 4 and 5 were then cooked (for 10 min at 92° C.). The other samples were not cooked. The end products each had a Brookfield viscosity between 700 and 900 mPas.

Sample 1 is included by way of comparative example—it is not a composition of the invention. Samples 2 to 6 are examples of sizing-adhesives according to the present invention.

TABLE 1

| (g) | Sample | | | | | |
|---|---|---|---|---|---|---|
| | 1 | 2 | 3 | 4 | 5 | 6 |
| Vinac XX-230[1] | 1420 | | | | | |
| Ecospheres HS[7] | | | | | | 189.1 |
| Sod. Lig.[4] | | 322 | | | | |
| C*iCoat 07525[6] | | 195 | | | | |
| C*036A6 (27-3)[6] | | | 540 | | | |
| C*036A5 (25-80)[6] | | | | 432 | 408 | |
| Maltodextrin[2] | | | | | | 312.2 |
| Borax Dec.[5] | | 9.0 | | | | 9.0 |
| NaOH-20% | | 4.8 | | | | 4.8 |
| Hydrocarb H 90 | | | | | 48 | |
| Water | 20 | 699 | 695 | 368 | 364 | 694.9 |
| Water (%) | 1.40 | 56.8 | 56.3 | 46 | 44.3 | 57.43 |
| TOTAL | 1440 | 1229.8 | 1235 | 800 | 820 | 1210 |
| Viscosity[3] (mPas) | 814 | 876 | 842 | 792 | 742 | 828 |

[1]Vinac XX-230 PVAc homopolymer emulsion, Benzoflex 50 plasticizer, Al-25-26-1
[2]MD01956 Maltodextrin (C*01955 Waxy)
[3]Brookfield viscosity at 25° C., 100 rpm with Spindle no. 4
[4]Sodium Lignosulfonate
[5]Borax Decahydrate
[6]From Cargill
[7]From Ecosynthetix, Inc.

The samples were then applied to 137 $g/m^2$ paper using a Sumet lab applicator with a 60 μm rod, a roll pressure of 50N, a rod pressure of 50N, at a speed of 15 m/min then dried by heating for 1 min at 80° C. with 20% IR (infra-red).

Table 2 shows the amount of add-on in $g/m^2$ and in percentage for each sample. The treated papers were then subjected to a number of stiffness tests (following standard Tappi Test Method procedures):

SCT CD (Short Span Compression Test in Cross Direction—Tappi no. T826 (wd-01))

SCT MD (Short Span Compression Test in Machine Direction—Tappi no. T826 (wd-01))

RCT MD (Ring Compression Test in Machine Direction—Tappi no. T818 (cm97))

The results of these tests are shown in Table 2, including a reference (Ref) uncoated paper.

TABLE 2

| | Paper Strength | | | | | | |
|---|---|---|---|---|---|---|---|
| | Ref | 1 | 2 | 3 | 4 | 5 | 6 |
| Add-on ($g/m^2$) | — | 8 | 8 | 9 | 10 | 11 | 6 |
| Add-on vs. Ref (%) | — | 5.8 | 5.8 | 6.6 | 7.3 | 8.0 | 4.4 |
| SCT CD (kN/m) | 2.502 | 2.595 | 2.918 | 2.919 | 3.001 | 3.087 | 2.904 |
| SCT CD-Index (Nm/g) | 18.3 | 18.9 | 21.3 | 21.3 | 21.9 | 22.5 | 21.2 |
| Increase (%) | — | 3.7 | 16.6 | 16.7 | 19.9 | 23.4 | 16.1 |
| Increase (%/g add-on) | — | 0.5 | 2.1 | 1.9 | 2.0 | 2.1 | 2.7 |
| SCT MD (kN/m) | 4.459 | 4.744 | 5.127 | 4.968 | 5.331 | 5.281 | 5.162 |
| SCT MD-Index (Nm/g) | 32.5 | 34.6 | 37.4 | 36.3 | 38.9 | 38.5 | 37.7 |
| Increase (%) | — | 6.4 | 15.0 | 11.4 | 19.6 | 18.4 | 15.8 |
| Increase (%/g add-on) | — | 0.8 | 1.9 | 1.3 | 2.0 | 1.7 | 2.6 |
| RCT MD (kN/m) | 1.32 | 1.3 | 1.6 | 1.57 | 1.6 | 1.5 | 1.4 |
| RCT MD-Index (Nm/g) | 9.6 | 9.5 | 11.7 | 11.5 | 11.7 | 10.9 | 10.2 |
| Increase (%) | — | −1.5 | 21.2 | 18.9 | 21.2 | 13.6 | 6.1 |
| Increase (%/g add-on) | — | −0.2 | 2.7 | 2.1 | 2.1 | 1.2 | 1.0 |

To determine the SCT Index, the measured SCT was divided by the original paper weight. For Table 2, the base paper weighed 137 gram/m2. The SCT CD of this paper was measured at 2.502 kN/m so the SCT CD-index could be determined as 18.3 Nm/g. For Sample 2, the SCT CD was 2.918 kN/m. This measurement was obtained by dividing the Sample 2 SCT CD measurement by the paper weight without adding the adhesive add-on because the sizing-adhesive is both gluing and strengthening the paper at the same time. Therefore the SCT CD-index was determined to be 21.3 Nm/g. The percent increase per gram add-on was calculated by dividing the Increase (%) by the total grams adhesive add-on. SCT MD and RCT MD measurements were calculated in a similar manner.

These results clearly show that adhesive compositions of the present invention (Samples 2-6) increase the strength of papers to which they are applied.

Samples 3 and 4 together with Sample 1 for comparison were then tested for adhesion using the Pin Adhesion Test (PAT—Tappi no. T821 (om-96)). This test measures the force required to separate the liner sheet and fluted sheet of a corrugated board. In the present example, the samples were applied, as above, to 137 g/m2 paper using a Sumet lab applicator. The coated, liner sheet was then brought into contact with a 100 μm fluted sheet and bonded at 140° C. for 15 sec. The results of these tests are shown in Table 3. Note: it is generally accepted that PAT results of 400 N/m (+/−20 N/m) are acceptable for making good quality corrugated board.

TABLE 3

| | Bonding | | |
|---|---|---|---|
| | Sample 1 | Sample 3 | Sample 4 |
| PAT C-flute DB-side (N/m) | 691 | 450 | 391 |

While Sample 1 provides very good bonding as shown in Table 3, it has very poor paper strengthening characteristics as shown in Table 2. Samples 3 and 4, made in accordance with the described invention, by contrast, provide bonding that is within the acceptable standards to make good quality corrugated board while also strengthening the paper. These results demonstrate that compositions in accordance with the present invention not only improve paper strength but also provide adhesion that would enable production of good quality corrugated paperboard.

Example 2

Samples were prepared by mixing the ingredients as listed in Table 4.

TABLE 4

| | Sample | |
|---|---|---|
| (wt %) | 7 | 8 |
| 07311 | — | 27.5 |
| EX07325 | 78.55 | — |
| Native corn starch | 18.55 | 2.5 |
| Borax | 1.5 | 0.25 |
| Calcium Hydroxide | 0.8 | — |
| Sodium Carbonate | 0.6 | — |

TABLE 4-continued

| | Sample | |
|---|---|---|
| (wt %) | 7 | 8 |
| NaOH—20% | — | 1 |
| Water | — | 68.75 |
| TOTAL | 100 | 100 |
| Dry Solids | 28% | 29% |

Sample 7 is supplied as a one bag mix, with the ingredients simply blended together. The dry mix is then added to cold water to create the desired solids level. EX07325 is a water soluble dextrin available from Cargill, Incorporated.

Sample 8 is made from a dry blend of 07311 and native starch. A portion of this blend (11% by weight) is combined with 45% by weight of the water plus sodium hydroxide and borax. These ingredients are then mixed and heated until smooth. While continuing to mix, the remaining water is added to cool the blend. Finally, the remaining starch is added. 7311 is a speciality modified starch manufactured by Cargill, Incorporated.

PAT, SCT (cross-direction) and RCT were measured as in Example 1, using a base paper with a weight of 135 g/m$^2$, an RCT of 1.06 kN/m and an SCT CD of 2.45 kN/m. The results are set out in Table 5.

TABLE 5

| | Sample 7 | Sample 8 |
|---|---|---|
| PAT MD (N/m) | 400 | 681 |
| SCT CD (kN/m) | 2.88 | 2.77 |
| RCT MD (kN/m) | 1.28 | 1.25 |
| Add-on of Adhesive (g/m$^2$) | 7 | 5 |
| SCT Paper Replacement Ratio (g paper/g adhesive) | 3.4 | 3.5 |
| RCT Paper Replacement Ratio (g paper/g adhesive) | 4.0 | 4.8 |

The RCT Paper Replacement Ratio was calculated by measuring the RCT (RCT1) of a base paper with a known weight (P1), coating the paper with a known weight of sizing-adhesive (S) and re-measuring the RCT (RCT2). Based on the second RCT value and on the known linear relationship between RCT and paper weight, one would expect the paper weight of the coated paper (P2) to be as follows:

$$P2=(RCT2/RCT1) \times P1$$

For Sample 7, $P2=(1.28/1.06) \times 135=163.0$ g/m$^2$

For Sample 8, $P2=(1.25/1.06) \times 135=159.2$ g/m$^2$

In other words, one would expect the paper weight of a paper with an RCT value, for example, of 4.0 to be nearly 510 g/m$^2$. In other words, by coating the paper with the sizing-adhesive, a certain amount of paper (E) has been eliminated, where E=P2−P1.

For Sample 7, $E=163.0-135=28.0$

For Sample 8, $E=159.2-135=24.2$

Thus, grams of paper eliminated per gram of sizing-adhesive add-on=E/S=RCT Paper Replacement Ratio.

For Sample 7=28.0/7=4.0 g per g add-on

For Sample 8=24.2/5=4.8 g per g add-on

The same calculation can be made with the SCT values for the SCT Paper Replacement Ratio.

The invention claimed is:

1. A sizing-adhesive for corrugating comprising:
a mixture of two or more polymers,
wherein at least one of the polymers, present in an amount of 30-95% by weight on a dry weight basis, is a water soluble polymer, wherein the water soluble polymer has a mean molecular weight (Mw) below 200,000 Daltons, wherein at least one of the polymers is selected from the group consisting of a polysaccharide, a polysaccharide derivative, and mixtures thereof, and wherein the adhesive has a Brookfield viscosity of between 100 and 3000 mPas when measured at 25° C., 100 rpm, and with a no. 4 spindle.

2. The sizing-adhesive of claim 1, wherein the polymer is selected from a polysaccharide, a polysaccharide derivative, sodium lignosulfonate, sodium silicate, polyvinyl alcohol, polyoxyethylene and mixtures of two or more thereof.

3. The sizing-adhesive of claim 1, wherein the polymer is selected from one or more maltodextrins.

4. The sizing-adhesive of claim 1, having a total dry substance of between 20 and 80% by weight.

5. The sizing-adhesive of claim 1, further comprising one or more additives selected from the group consisting of: fillers, bonding additives, humectants, tackifiers, water resistance resins, rheology modifiers, antifoam agents, preservatives, anti-microbials and mixtures of two or more thereof.

6. The sizing-adhesive of claim 1, having a pH of 7 or above.

7. A corrugated board which comprises at least one sheet of corrugating medium bonded to at least one liner sheet, wherein:
one or more of the sheets of corrugating medium or one or more of the liner sheets are coated with the sizing-adhesive of claim 1; or
at least one sheet of corrugating medium is bonded to at least one liner sheet with said sizing-adhesive.

8. The corrugated board of claim 7, wherein one or more of the at least one liner sheets or at least one corrugated medium sheets weighs no more than 400 g/m$^2$.

9. A process for producing corrugated board, comprising the following steps:
providing at least one sheet of corrugating medium and at least one liner sheet;
coating the liner sheet or corrugating medium on at least one surface with the sizing-adhesive of claim 1;
bringing the corrugating medium or liner sheets together to cause adhesion; and
drying the resulting corrugated board.

10. The process of claim 9, wherein the step of contacting the sheets is performed at a temperature below 200° C.

11. The process of claim 9, wherein the at least one liner sheet is coated with the sizing-adhesive in an amount of up to 20 g/m$^2$ on a dry weight basis.

12. A method of reducing the required weight of sheets used in the manufacture of corrugated board comprising coating said sheets with the sizing-adhesive of claim 1.

13. The method of claim 12 wherein the required weight of the sheets can be reduced by up to 15 g/m$^2$ per gram of sizing-adhesive add-on.

14. The sizing-adhesive of claim 1, wherein at least one of the polymers is selected from the group consisting of a native starch, a modified starch, and mixtures thereof.

\* \* \* \* \*